United States Patent
Gariepy et al.

(10) Patent No.: US 11,586,208 B2
(45) Date of Patent: Feb. 21, 2023

(54) SYSTEMS AND METHODS FOR EXECUTING A TASK WITH AN UNMANNED VEHICLE

(71) Applicant: Clearpath Robotics Inc., Kitchener (CA)

(72) Inventors: Ryan Christopher Gariepy, Kitchener (CA); Yan Ma, Waterloo (CA); Alex Bencz, Kitchener (CA)

(73) Assignee: Clearpath Robotics Inc., Kitchener (CA)

( * ) Notice: Subject to any disclaimer, the term of this patent is extended or adjusted under 35 U.S.C. 154(b) by 140 days.

(21) Appl. No.: 16/248,944

(22) Filed: Jan. 16, 2019

(65) Prior Publication Data
US 2020/0225664 A1     Jul. 16, 2020

Related U.S. Application Data

(63) Continuation of application No. 15/827,391, filed on Nov. 30, 2017, now Pat. No. 10,191,494, which is a
(Continued)

(51) Int. Cl.
    *G05D 1/02*     (2020.01)
    *G05D 1/00*     (2006.01)
    *B60P 1/38*     (2006.01)

(52) U.S. Cl.
    CPC ............. *G05D 1/0212* (2013.01); *B60P 1/38* (2013.01); *G05D 1/0011* (2013.01); *G05D 2201/0216* (2013.01)

(58) Field of Classification Search
    CPC ........ G05D 1/0212; G05D 1/0011; B60P 1/38
(Continued)

(56) References Cited

U.S. PATENT DOCUMENTS

| | | | | |
|---|---|---|---|---|
| 5,525,883 A | * | 6/1996 | Avitzour | G05D 1/0274 318/568.1 |
| 5,911,767 A | * | 6/1999 | Garibotto | G05D 1/0272 701/28 |

(Continued)

OTHER PUBLICATIONS

Liu et al., Design and Implementation of a Mini Quadrotor Control System in GPS Denied Environments, 2015, IEEE, p. 462-469.
(Continued)

*Primary Examiner* — Albert K Wong
(74) *Attorney, Agent, or Firm* — Bereskin & Parr LLP/S.E.N.C.R.L.,s.r.l.

(57) ABSTRACT

A system, method and apparatus for executing tasks with unmanned vehicles is provided. The system includes an unmanned vehicle comprising: a chassis; a propulsion system configured to move the chassis; sensor(s) configured to sense features around the chassis; a memory storing feature reference data; a communication interface; and a processor configured to: receive, using the interface, a command having task data and a location associated with a given feature; control the propulsion system to move the chassis to the location; while the chassis is moving to the location, determine, using the sensor(s), that the given feature is detected based on the feature reference data; and, responsive to the given feature being detected, control the propulsion system to execute a task based on the task data.

15 Claims, 13 Drawing Sheets

Related U.S. Application Data continuation of application No. 14/883,698, filed on Oct. 15, 2015, now Pat. No. 9,891,630.

(60) Provisional application No. 62/068,177, filed on Oct. 24, 2014.

(58) Field of Classification Search
USPC .......................................................... 701/2
See application file for complete search history.

(56) References Cited

U.S. PATENT DOCUMENTS

| | | | | |
|---|---|---|---|---|
| 7,499,776 | B2 * | 3/2009 | Allard | G05D 1/0061 |
| | | | | 701/1 |
| 7,499,804 | B2 * | 3/2009 | Svendsen | G05D 1/027 |
| | | | | 340/426.11 |
| 7,789,723 | B2 * | 9/2010 | Dane | B63G 8/001 |
| | | | | 440/6 |
| 8,078,338 | B2 * | 12/2011 | Pack | G05D 1/0011 |
| | | | | 701/1 |
| 8,346,391 | B1 * | 1/2013 | Anhalt | B25J 9/163 |
| | | | | 700/248 |
| 8,577,538 | B2 | 11/2013 | Lenser et al. | |
| 8,965,620 | B2 * | 2/2015 | Bosscher | B25J 13/006 |
| | | | | 701/23 |
| 9,156,552 | B2 * | 10/2015 | Freeman | F42B 12/365 |
| 9,465,388 | B1 * | 10/2016 | Fairfield | G05D 1/0044 |
| 9,817,396 | B1 * | 11/2017 | Takayama | G06K 9/00637 |
| 9,891,630 | B2 | 2/2018 | Gariepy et al. | |
| 10,301,018 | B2 * | 5/2019 | Mucci | B64C 39/024 |
| 2009/0074545 | A1 | 3/2009 | Lert, Jr. et al. | |
| 2009/0214079 | A1 * | 8/2009 | Hamza | G06K 9/00798 |
| | | | | 382/103 |
| 2011/0144828 | A1 | 6/2011 | Chengalva | |
| 2013/0038715 | A1 * | 2/2013 | Ichikawa | B60L 53/36 |
| | | | | 348/118 |
| 2013/0096735 | A1 * | 4/2013 | Byford | G05D 1/0234 |
| | | | | 701/2 |
| 2015/0006005 | A1 | 1/2015 | Yu et al. | |
| 2015/0077557 | A1 * | 3/2015 | Han | B60D 1/36 |
| | | | | 348/148 |
| 2016/0068267 | A1 | 3/2016 | Liu et al. | |
| 2016/0070264 | A1 | 3/2016 | Hu et al. | |
| 2016/0076892 | A1 | 3/2016 | Zhou et al. | |
| 2016/0124434 | A1 | 5/2016 | Gariepy et al. | |
| 2016/0129917 | A1 | 5/2016 | Gariepy et al. | |
| 2016/0349749 | A1 | 12/2016 | Gariepy et al. | |
| 2017/0195549 | A1 | 7/2017 | Cao et al. | |

OTHER PUBLICATIONS

Brockers et al., Towards autonomous navigation of miniature UAV, 2014, IEEE, p. 645-651.

Scaramuzza et al., Vision-Controlled Micro Flying Robots: From System Design to Autonomous Navigation and Mapping in GPS-Denied Environments, 2014, IEEE, p. 26-40 (Year: 2014).

Blumenau et al., Design and implementation of an Intelligent Aerial Surveillance System (IPASS), 2013, IEEE, p. 1-6 (Year: 2013).

Pereira et al., Development of Hand-Launched Small UAV for Ground Reconnaissance, 2010, IEEE, p. 335-348</i> (Year: 2010).

* cited by examiner

300

```
┌─────────────────────────────────────────────────────────────┐
│ Receive, Using The Communication Interface, A Command To    │
│ Move To A Given Coordinate In The Global Reference Frame    │
│                           301                               │
└─────────────────────────────────────────────────────────────┘
                              ↓
┌─────────────────────────────────────────────────────────────┐
│ Control The Propulsion System To Move The Chassis To The    │
│ Given Coordinate In The Global Reference Frame Based On     │
│                      The Command                            │
│                           303                               │
└─────────────────────────────────────────────────────────────┘
                              ↓
                    ╱ Chassis At Given ╲
                    ╲   Coordinate?    ╱──── No
                    ╲      305       ╱
                         Yes ↓
                    ╱  Given Feature  ╲
                    ╲    Detected?    ╱──── No
                    ╲      307       ╱
                         Yes ↓
┌─────────────────────────────────────────────────────────────┐
│ Automatically Cease Controlling The Propulsion System       │
│           According To The Global Reference Frame           │
│                           309                               │
└─────────────────────────────────────────────────────────────┘
                              ↓
┌─────────────────────────────────────────────────────────────┐
│ Automatically Control The Propulsion System To Move The     │
│ Chassis According To A Local Reference Frame Defined With   │
│ Reference To A Point Associated With The Given Feature      │
│                           311                               │
└─────────────────────────────────────────────────────────────┘
```

FIG. 3

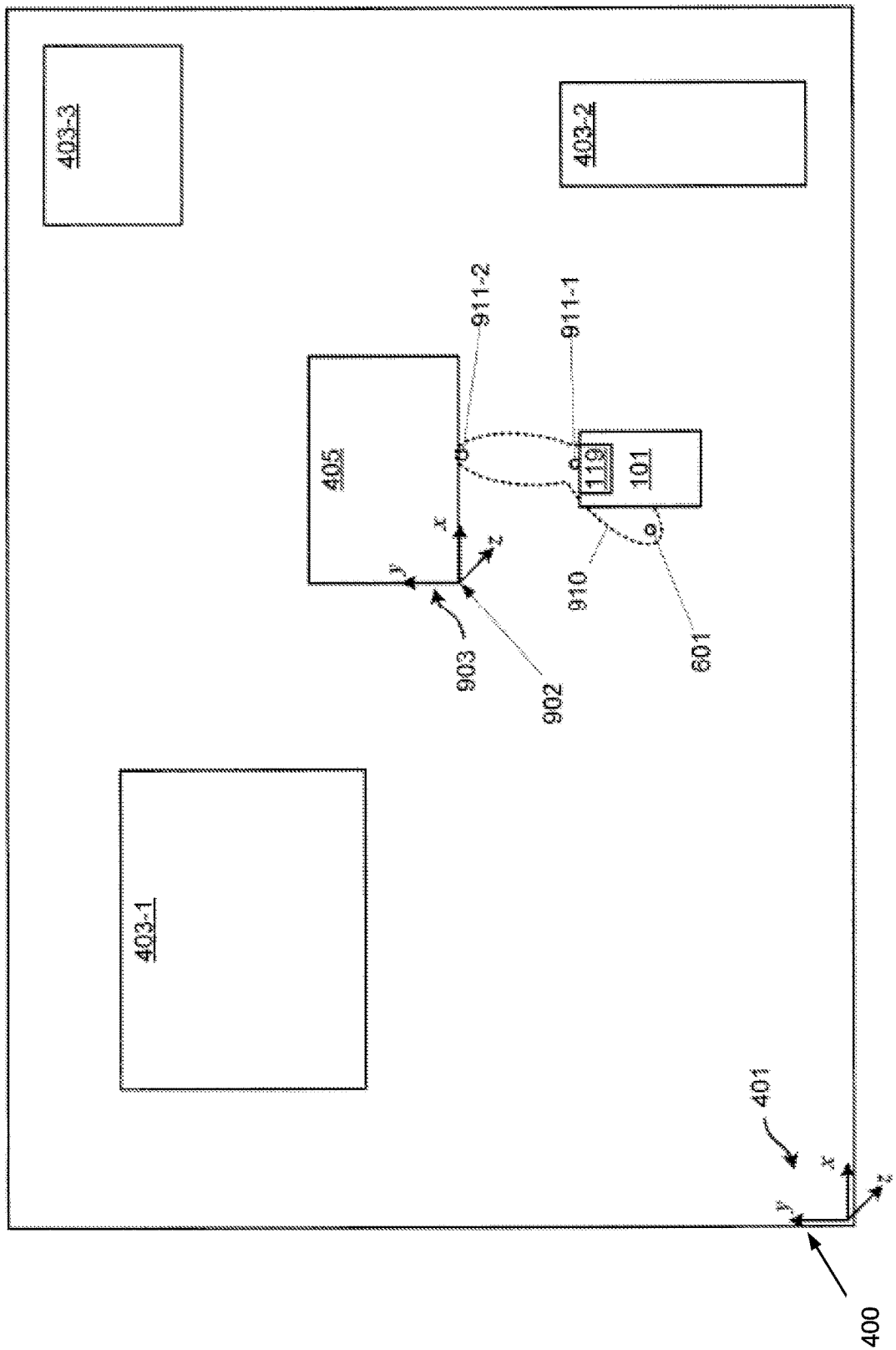

SYSTEMS AND METHODS FOR EXECUTING A TASK WITH AN UNMANNED VEHICLE

CROSS-REFERENCE TO RELATED APPLICATIONS

This application is a continuation of U.S. patent application Ser. No. 15/827,391, filed on 30 Nov. 2017, entitled "Variable Reference Frames in Unmanned Vehicles", which is a continuation of U.S. patent application Ser. No. 14/883,698, filed on 15 Oct. 2015, entitled "Variable Reference Frames in Unmanned Vehicles", which claims priority to U.S. Provisional Patent Application No. 62/068,177, filed on 24 Oct. 2014, all of which are incorporated by reference herein in their entirety.

FIELD

The specification relates generally to unmanned vehicles ("UVs"), and specifically to executing tasks with unmanned vehicles.

BACKGROUND

Unmanned vehicles generally operate according to a global reference frame in that they generally move from place to place in the global reference frame and all movements within their environment are controlled according to the global reference frame. However, this becomes problematic when an unmanned vehicle is attempting to manoeuvre close to objects within the environment, for example as on a factory floor where the location of objects are not fixed. Indeed, if a map associated with the reference frame is not updated to show a precise location of the objects after they move, then both the objects and the unmanned vehicles, which can weigh hundreds and/or thousands of kilograms, can be damaged.

SUMMARY

The present specification provides an unmanned vehicle which is configured to switch between a global reference frame and a local reference frame, defined with reference to a point associated with a given feature sensed within an environment within which the unmanned vehicle is moving. For example, the unmanned vehicle can receive a command to move to a given coordinate in the global reference frame, in order to implement a task. Once at, and/or near, the given coordinate, and when the given feature is detected, the unmanned vehicle switches to operating in the local reference frame in order to implement the task. As the local reference frame is defined with respect to the given feature (which can, for example, be located at and/or on an object (e.g. a conveyor) on a factory floor where loading and/or unloading is to occur), if a location of the given feature has changed, implementation of the task is unaffected as the unmanned object moves according to the local reference frame and not the global reference frame. Once the task is completed, the unmanned vehicle can switch back to using the global reference frame. Indeed, as disclosed herein, the unmanned vehicle is generally configured to: automatically switch between using the global reference frame and using the local reference frame based on one or more of: whether the unmanned vehicle is at one or more given locations; one or more given features detected using one or more sensors at the unmanned vehicle; and whether processing of task data has been completed (e.g. a task is completed).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

In this specification, elements may be described as "automatically" performing given functions. In general, an element that "automatically" performs given functions can perform those functions without interference by and/or assistance of a human being and/or a user, unless otherwise specified.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the specification provides an unmanned vehicle comprising: a chassis; a propulsion system configured to move the chassis; one or more sensors configured to sense features around the chassis; a memory storing a global reference frame associated with an environment within which the chassis is to move; a communication interface; and a processor configured to: receive, using the communication interface, a command to move to a given coordinate in the global reference frame; control the propulsion system to move the chassis to the given coordinate in the global reference frame based on the command; when the chassis is at the given coordinate, determine, using the one or more sensors, that a given feature is detected; and, when the given feature is detected: automatically cease controlling the propulsion system according to the global reference frame; and, automatically control the propulsion system to move the chassis according to a local reference frame defined with reference to a point associated with the given feature.

The processor can be further configured to: receive, using the communication interface, task data in association with receiving the command; and, when the chassis is at the given coordinate and when the given feature is detected: control the propulsion system to move the chassis according to the task data and according to the local reference frame. The task data can comprise one or more further commands for controlling the chassis to move with respect to the local reference frame.

The global reference frame can be associated with a digital map of the environment within which the chassis is to move.

The processor can be further configured to switch to a reactive mode when automatically controlling the propulsion system to move the chassis according the local reference frame. The processor can be further configured to operate in the reactive mode by controlling the propulsion system to perform given movements when given features are detected using sensor data.

The processor can be further configured to change from a first set of control parameters to second set of control parameters when automatically controlling the propulsion system to move the chassis according the local reference frame.

The memory can further store data representative of the feature, the processor further configured to determine that the feature is detected by comparing sensor data received from the one or more sensors with the data representative of the feature.

The processor can be further configured to determine that the chassis is at the given coordinate, by one more of: using the one or more sensors, at least one of the one or more sensors configured to observe coordinates of the chassis within the global reference frame; using a GPS (Global Positioning System) device; using simultaneous localization and mapping ("SLAM") techniques; using a motion capture system; processing one or more geofences associated with the given coordinate; and determining that the chassis is within a given distance from the given coordinate.

The processor can be further configured to: process task data when controlling the propulsion system to move the chassis according the local reference frame; and, when processing of the task data are completed: automatically cease controlling the propulsion system according to the local reference frame; and, automatically control the propulsion system to move the chassis according the global reference frame.

The processor can be further configured to automatically switch between using the global reference frame and using the local reference frame based on one or more of: whether the chassis is at one or more given locations; one or more given features detected using the one or more sensors; and whether processing of task data has been completed.

Another aspect of the specification provides a method comprising: receiving, at a processor of an unmanned vehicle, using a communication interface of the unmanned vehicle, a command to move to a given coordinate in a global reference frame, the unmanned vehicle comprising: a chassis; a propulsion system configured to move the chassis; one or more sensors configured to sense features around the chassis; a memory storing a global reference frame associated with an environment within which the chassis is to move; the communication interface; and the processor; controlling, using the processor, the propulsion system to move the chassis to the given coordinate in the global reference frame based on the command; when the chassis is at the given coordinate, determining, at the processor and using the one or more sensors, that a given feature is detected; and, when the given feature is detected: automatically ceasing, using the processor, controlling the propulsion system according to the global reference frame; and, automatically controlling, using the processor, the propulsion system to move the chassis according to a local reference frame defined with reference to a point associated with the given feature.

The method can further comprise: receiving, using the communication interface, task data in association with receiving the command; and, when the chassis is at the given coordinate and when the given feature is detected: control the propulsion system to move the chassis according to the task data and according to the local reference frame.

The global reference frame can be associated with a digital map of the environment within which the chassis is to move.

The method can further comprise switching to a reactive mode when automatically controlling the propulsion system to move the chassis according the local reference frame.

The method can further comprise changing from a first set of control parameters to second set of control parameters when automatically controlling the propulsion system to move the chassis according the local reference frame.

The memory can further store data representative of the feature, and the method further can comprise determining that the feature is detected by comparing sensor data received from the one or more sensors with the data representative of the feature.

The method can further comprise determining that the chassis is at the given coordinate, by one more of: using the one or more sensors, at least one of the one or more sensors configured to observe coordinates of the chassis within the global reference frame; using a GPS (Global Positioning System) device; using simultaneous localization and mapping ("SLAM") techniques; using a motion capture system; processing one or more geofences associated with the given coordinate; and determining that the chassis is within a given distance from the given coordinate.

The method can further comprise: processing task data when controlling the propulsion system to move the chassis according the local reference frame; and, when processing of the task data are completed: automatically ceasing controlling the propulsion system according to the local reference frame; and, automatically controlling the propulsion system to move the chassis according the global reference frame.

The method can further comprise automatically switching between using the global reference frame and using the local reference frame based on one or more of: whether the chassis is at one or more given locations; one or more given features detected using the one or more sensors; and whether processing of task data has been completed.

Yet a further aspect of the specification provides a computer program product, comprising a computer usable medium having a computer readable program code adapted to be executed to implement a method comprising: receiving, at a processor of an unmanned vehicle, using a communication interface of the unmanned vehicle, a command to move to a given coordinate in a global reference frame, the unmanned vehicle comprising: a chassis; a propulsion system configured to move the chassis; one or more sensors configured to sense features around the chassis; a memory storing a global reference frame associated with an environment within which the chassis is to move; the communication interface; and the processor; controlling, using the processor, the propulsion system to move the chassis to the given coordinate in the global reference frame based on the command; when the chassis is at the given coordinate, determining, at the processor and using the one or more sensors, that a given feature is detected; and, when the given feature is detected: automatically ceasing, using the processor, controlling the propulsion system according to the global reference frame; and, automatically controlling, using the processor, the propulsion system to move the chassis according to a local reference frame defined with reference to a point associated with the given feature. The computer usable medium can comprise a non-transitory computer usable medium.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 3 depicts a method for implementing variable reference frames in unmanned vehicles, according to non-limiting implementations.

FIG. 9b depicts the unmanned vehicle following a path in the local reference frame in the environment of FIG. 4, according to non-limiting implementations.

DETAILED DESCRIPTION

Figure 1:
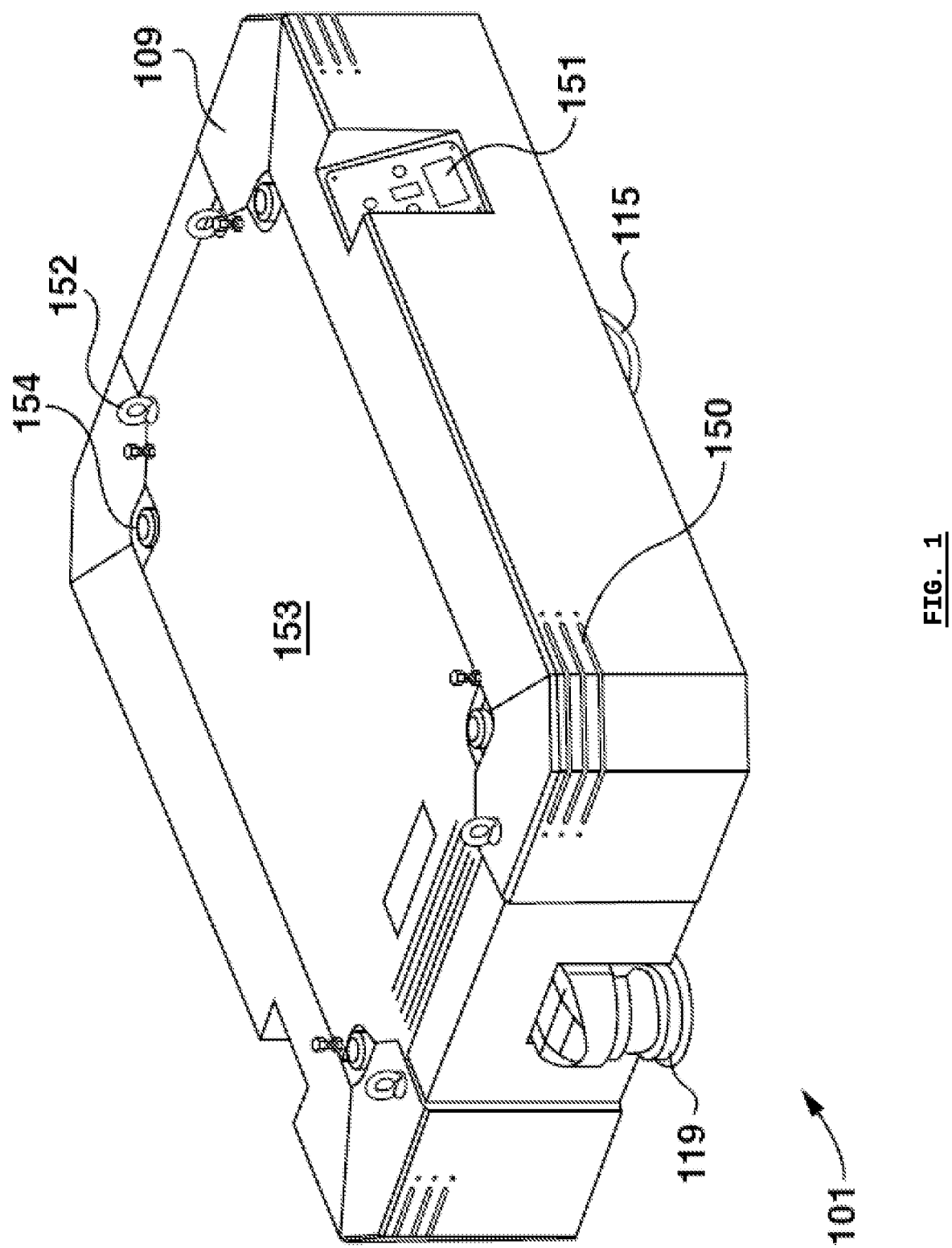
FIG. 1 depicts external characteristics features of an unmanned vehicle, according to non-limiting implementations.
Figure 2:
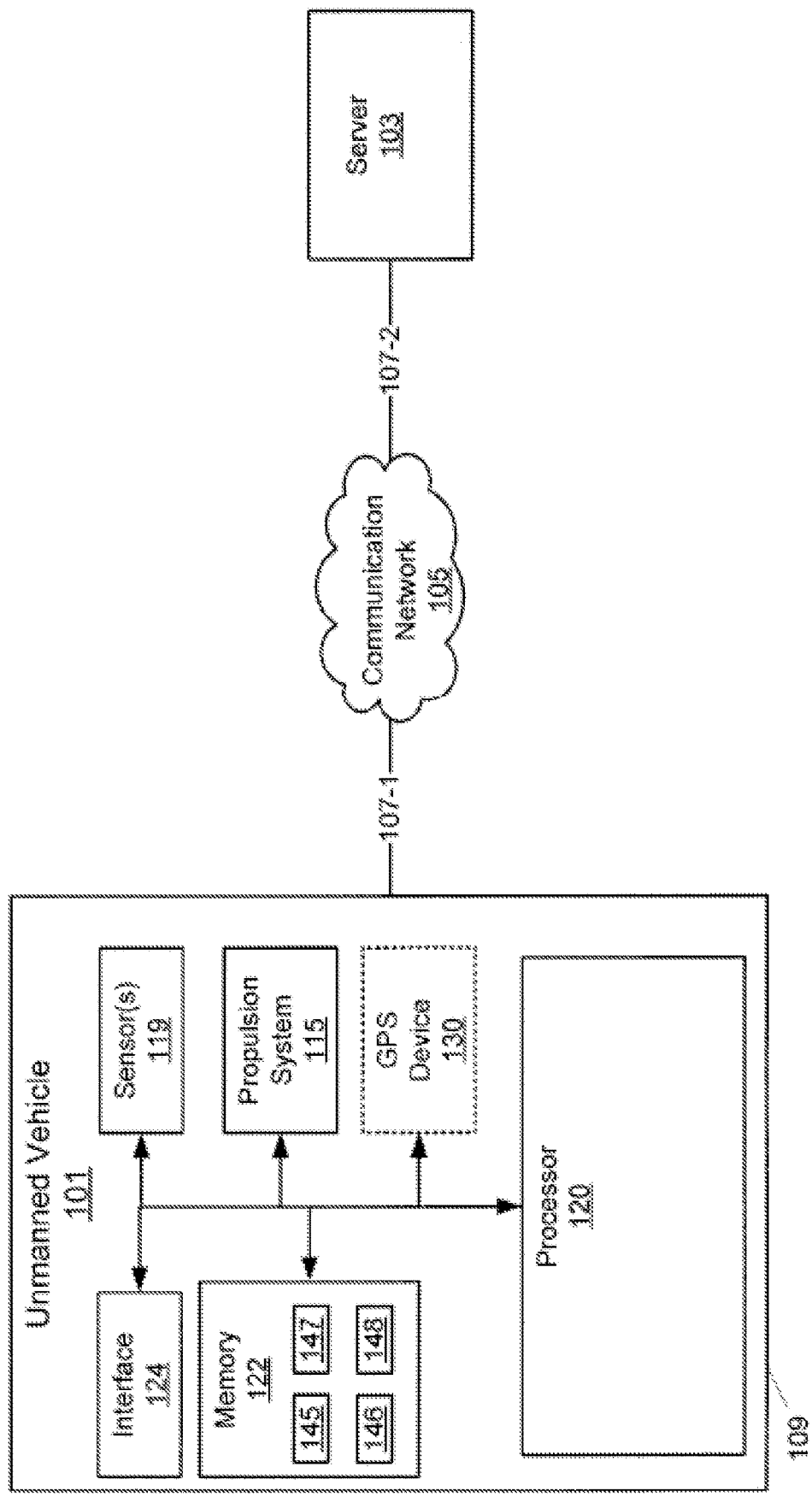
FIG. 2 depicts a schematic block diagram of a system which includes the unmanned vehicle of FIG. 1, according to non-limiting implementations.

FIG. 1 depicts external features of an unmanned vehicle 101; and FIG. 2 depicts a schematic diagram of a system 200 which includes unmanned vehicle 101, a server 103 and a communication network 105 (interchangeably referred to hereafter as network 105), according to non-limiting implementations, in communication via links 107-1, 107-2 (interchangeably referred to hereafter, collectively, as links 107 and, generically, as a link 107). In general, links 107 can be wireless links. Unmanned vehicle 101 comprises: a chassis 109; a propulsion system 115 configured to move chassis 109 and/or unmanned vehicle 101; one or more sensors 119 configured to sense features around chassis 109; a processor 120; and a memory 122 storing a global reference frame 145 associated with an environment within which chassis 109 is to move, and a local reference frame 146 defined with reference to a point associated with a given feature, as described in further detail below; and, a communication interface 124 (interchangeable referred to hereafter as interface 124). Memory 122 can also store local reference frame 146.

As depicted, unmanned vehicle 101 comprises an optional Global Positioning System (GPS) device 130 configured to determine a location of chassis 109 and/or unmanned vehicle 101 within environment within which chassis 109 and/or unmanned vehicle 101 is to move, the location related to a coordinate within global reference frame 145, as described in further detail below.

Processor 120 is generally configured to: receive, using communication interface 124, a command to move to a given coordinate in global reference frame 145; control propulsion system 115 to move chassis 109 to the given coordinate in global reference frame 145 based on the command; when chassis 109 and/or unmanned vehicle 101 is at the given coordinate, determine, using one or more sensors 119, that a given feature is detected; and, when the given feature is detected: automatically cease controlling propulsion system 115 according to the global reference frame; and, automatically control propulsion system 115 to move chassis 109 and/or unmanned vehicle 101 according to a local reference frame 146 defined with reference to a point associated with the given feature.

Unmanned vehicle 101 can generally comprise one or more of a robot, an unmanned ground vehicle, an unmanned aerial vehicle, an unmanned surface vehicle, an unmanned watercraft, an unmanned underwater and/or undersea vehicle, an unmanned spacecraft, aquatic vehicles, amphibious vehicles, aeronautic vehicles any other suitable vehicle, and/or a combination, and the like, configured to receive commands from server 103 via network 105 and links 107 to move to a given coordinate and/or perform a given task, and implement movement to the given coordinate and/or performance of the given task without person on board. In other words, unmanned vehicle 101 can comprise a remote controlled and/or remote guided vehicles and/or an autonomous vehicle which can operate without human intervention in the environment.

Each of links 107 can comprise any suitable links for enabling unmanned vehicle 101 and server 103 to communicate using network 105. Links 107 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), WiFi access points, and the like, and/or a combination. However, at least link 107-1 can be generally wireless so that unmanned vehicle 101 can move within the environment untethered and/or wirelessly.

Network 105 can hence comprise any suitable combination of: wired networks, wireless networks, cell-phone networks, cellular network networks (including but not limited to 2G, 2.5G, 3G, 4G+, and the like), Bluetooth networks, NFC (near field communication) networks, WiFi networks, WiMax networks, packet based networks, the Internet, analog networks, the PSTN (public switched telephone network), WiFi access points, and the like, and/or a combination.

As depicted, in FIG. 1, unmanned vehicle 101 comprises a wheeled land vehicle and, in particular, a wheeled vehicle that can be used within a warehouse to one or more of move and/or carry inventory and/or items within the warehouse and/or perform tasks within the warehouse for example by interacting with features within the warehouse including, but not limited to, conveyors and the like.

Indeed, it should be emphasized that the shape and structure of unmanned vehicle 101 in FIGS. 1 and 2 are purely examples, and contemplate a device that can be used for autonomous and/or remote controlled wheeled movement. However, FIG. 1 contemplates a device that can be used for any suitable specialized functions, including, but not limited, to one or more of, warehouse applications, environmental applications, farming applications, and/or any application that can be implemented by a wheeled vehicle.

With reference to FIG. 1, an exterior of unmanned vehicle 101 is depicted with one or more sensors 119 mounted on a front portion of chassis 109, and one or more wheels of propulsion system 115 extending from a bottom of unmanned vehicle 101; however, the shape and configuration of unmanned vehicle 101 depicted in FIG. 1 is merely an example and other shapes and configurations are within the scope of present implementations. While internal components of unmanned vehicle 101 are not depicted in FIG. 1, they are nonetheless present, as depicted in FIG. 2.

Furthermore, FIG. 1 further depicts other external features of unmanned vehicle 101 according to non-limiting implementations. For example, as depicted, unmanned vehicle 101 can comprise indicator lights 150 (e.g. the three slits on each corner), a control panel 151, attachment points 152 (e.g. hooks), a mounting and/or load bearing surface 153 configured to support and/or carry a payload, and load cell positions 154 on each of four corners of surface 153 configured to sense the weight of a payload on surface 153. However, other features are within the scope of present implementations, including, but not limited to: force and/or torque sensors configured to sense a direction of shear of payloads; mounting points for sensors, computing systems, and other devices; drawers, handles, latches and the like for accessing an interior of unmanned vehicle 101; bumpers; battery bays and/or battery bay latches; and controls, including, but not limited to, a latching pushbutton configured to activate and deactivate unmanned vehicle 101, and a safety pushbutton configured to stop unmanned vehicle 101 in an emergency, and the like. Other types of features are within the scope of present implementations including, but not limited to, features associated with any specialized functions of unmanned vehicle 101; for example, when unmanned vehicle 101 comprises an aquatic vehicle, unmanned vehicle 101 can comprise features associated with aquatic operation of unmanned vehicle 101 and, when unmanned vehicle 101 comprises an aeronautic vehicle, unmanned vehicle 101 can comprise features associated with aeronautic operation of unmanned vehicle 101, etc.

With reference to FIG. 2, unmanned vehicle 101 further comprises a computer and/or communication bus, and the like, used by components of unmanned vehicle 101 for communication and/or control of unmanned vehicle 101. In particular, data and/or commands received at interface 124 are, in turn, received at processor 120 (which can be implemented as a plurality of processors, including but not limited to one or more central processors (CPUs); in particular processor 120 can comprise a hardware processor). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of unmanned vehicle 101 as described herein are typically maintained, persistently, in memory 122 and used by processor 120 which makes appropriate utilization of volatile storage during the execution of such programming instructions. Those skilled in the art will now recognize that memory 122 is an example of computer readable media that can store programming instructions executable on processor 120. Furthermore, memory 122 is also an example of a memory unit and/or memory module.

Memory 122 further stores an application 147 that, when processed by processor 120, enables processor 120 to: receive, using communication interface 124, a command to move to a given coordinate in global reference frame 145; control propulsion system 115 to move chassis 109 to the given coordinate in global reference frame 145 based on the command; when chassis 109 and/or unmanned vehicle 101 is at the given coordinate, determine, using one or more sensors 119, that a given feature is detected; and, when the given feature is detected: automatically cease controlling propulsion system 115 according to the global reference frame; and, automatically control propulsion system 115 to move chassis 109 and/or unmanned vehicle 101 according to a local reference frame 146 defined with reference to a point associated with the given feature.

Furthermore, memory 122 storing application 147 is an example of a computer program product, comprising a non-transitory computer usable medium and/or non-transitory memory having a computer readable program code adapted to be executed to implement a method, for example a method stored in application 147.

As depicted, memory 122 also stores global reference frame 145 and local reference frame 146, each comprising parameters and/or control parameters that can be processed by processor 120 to control propulsions system 115 according to a respective reference frame, as described in more detail below.

As depicted, memory 122 also stores data 148 that is representative of a feature within in environment within which unmanned vehicle 101 is to move, as described in more detail below.

Processor 120 also connects to communication interface 124 (interchangeably referred to interchangeably as interface 124), which can be implemented as one or more radios and/or connectors and/or network adaptors, configured to wirelessly communicate one or more communication networks, including network 105, and server 103 via one or more links, including link 107-1. It will be appreciated that interface 124 is configured to correspond with network architecture that is used to implement at least link 107-1 to network 105, including but not limited to any suitable combination of wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, Bluetooth links, NFC (near field communication) links, WLAN (wireless local area network) links, WiFi links, WiMax links, packet based links, the Internet, analog networks, the PSTN (public switched telephone network), access points, and the like, and/or a combination.

Specifically, interface 124 comprises radio equipment (i.e. a radio transmitter and/or radio receiver) for receiving and transmitting signals and/or commands and/or task data via link 107-1.

Propulsion system 115 can comprise any suitable propulsion system configured to move chassis 109 and/or unmanned vehicle 101 within an environment. While propulsion system 115 is depicted as wheels in FIG. 1, propulsion system 115 can generally comprise a propulsion system corresponding to a vehicle type of unmanned vehicle 101. For example, while only wheels are depicted in FIG. 1, propulsion system 115 can comprise any suitable combination of motors, steering apparatus, actuators, wheels, treads, and the like that enables unmanned vehicle 101 to move within a land-based environment. For example, while only one wheel is depicted in FIG. 1, due to the perspective of FIG. 1, propulsion system 115 can comprise any number of wheels and further any number of motors and/or actuators for driving and/or steering and/or moving and/or turning and/or pivoting the wheels.

Furthermore, when unmanned vehicle 101 comprises an aquatic vehicle, propulsion system 115 can comprise one or more aquatic propellers, one or more aquatic jets, one or more pumps and the like. Similarly, when unmanned vehicle 101 comprises an aeronautic vehicle, propulsion system 115 can comprise one or more propellers, one or more aeronautic jets, and the like.

Indeed, chassis 109 can similarly correspond to a vehicle type of unmanned vehicle 101. For example, as depicted, chassis 109 comprises a shape and/or configuration suitable for wheeled movement, with a bottom of chassis 109 located a distance from an outer edge of the wheels (i.e. so that chassis 109 can clear a floor which with the wheels are interacting). Similarly, when unmanned vehicle 101 comprises an aquatic vehicle, chassis 109 can comprise pontoons, a keel, and the like. Furthermore, when unmanned vehicle 101 comprise an aeronautical vehicle, chassis 109 can comprises wings, stabilizers, and the like.

One or more sensors 119 can comprise one or more sensors configured to detect features within the environment within which chassis 109 and/or unmanned vehicle 101 is to move, including, but not limited to, one or more cameras, one or more LIDAR (Light Detection and Ranging) devices, one or more laser sensing devices, one or more radar devices, one or more accelerometers, one or more magnetometers, and the like. Furthermore, while only one sensor 119 is depicted in FIG. 1, located at a centre of a front of chassis 109, in other implementations, unmanned vehicle 101 can comprise two or more sensors 119 located anywhere on chassis 109, including, but not limited to, raised from chassis 109 using any suitable combination of mounting devices. Furthermore, one or more sensors 119 can be off-centre from chassis 109.

As described in further detail below, in particular, one or more sensors 119 are configured to sense and/or detect features, and in particular at least a given feature, of an environment within which unmanned vehicle 101 is to move. As such, memory 122 can further store data 148 representative of the given feature, processor 120 configured to determine that the given feature is detected by comparing sensor data received from one or more sensors 119 with data 148 representative of the given feature. For example, when the feature comprises a conveyor, data 148 can be representative of a shape of the conveyor as viewed from a given angle and/or given position within the environment and/or from a given coordinate in global reference frame 145, as described below with reference to FIG. 8.

In addition, one or more sensors 119 can be used to determine an orientation of chassis 109 and/or unmanned vehicle 101 within global reference frame 145, as described in further detail below.

As depicted, unmanned vehicle 101 comprises an optional GPS device 130, which is generally configured to communicate with an external Global Positioning System in order to determine a location of chassis 109 and/or unmanned vehicle 101. However, any suitable device, and/or combination of devices, can be used to determine a location of chassis 109 and/or unmanned vehicle 101, which can be internal to chassis 109 and/or unmanned vehicle 101 and/or external to chassis 109 and/or unmanned vehicle 101 including, but not limited to a motion capture system. Furthermore, in other implementations, one or more sensors 119 can be used to determine a coordinate of chassis 109 and/or unmanned vehicle 101 within global reference frame 145. For example, at least one of one or more sensors 119 can be configured to observe coordinates of chassis 109 and/or unmanned vehicle 101 within global reference frame 145, for example by sensing the environment and/or features therein and/or positional markers therein.

Regardless, processor 120 can generally be further configured to determine that chassis 109 and/or unmanned vehicle 101 is at a given coordinate in global reference frame 145, by one more of: using one or more sensors 119, at least one of one or more sensors 119 configured to observe coordinates of chassis 109 and/or unmanned vehicle 101 within global reference frame 145; using GPS (Global Positioning System) device 130; using a motion capture system; processing one or more geofences associated with the given coordinate; using simultaneous localization and mapping ("SLAM") techniques; using other sensor processing-based methods; and determining that chassis 109 and/or unmanned vehicle 101 is within a given distance from the given coordinate, as described in further detail below.

While also not depicted, unmanned vehicle 101 further comprises a power source, including, but not limited to a battery, a power pack and the like.

In any event, it should be understood that a wide variety of configurations for unmanned vehicle 101 are contemplated.

Server 103 generally comprises one or more servers configured to control unmanned vehicle 101 by transmitting commands and/or task data to unmanned vehicle 101 via links 107 and network 105. Server 103 can be based on any well-known server environment including a module that houses one or more central processing units, volatile memory (e.g. random access memory), persistent memory (e.g. hard disk devices) and network interfaces to allow server 103 to communicate over link 107-2. For example, server 103 can be a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for server 103 are contemplated. For example, server 103 can comprise a computing device, including but not limited to one or more of a personal computer, a laptop computer, and a mobile computing device, configured to generate and transmit commands to unmanned vehicle 101 using network 105 and links 107.

In particular, server 103 can be configured to transmit commands and/or task data to unmanned vehicle 101 according to global reference frame 145 and/or local reference frame 146. In addition, communication between server 103 and unmanned vehicle 101 can be in both directions (i.e. unmanned vehicle 101 can transmit data to server 103, including, but not limited to, a position of chassis 109 and/or unmanned vehicle 101 within an environment within which chassis 109 and/or unmanned vehicle is moving and/or a coordinate of chassis 109 and/or unmanned vehicle 101 within global reference frame 145 and/or a coordinate of chassis 109 and/or unmanned vehicle 101 within local reference frame 146, and/or when chassis 109 and/or unmanned vehicle 101 has arrived at a given coordinate and/or completed implementation of a given command and/or task data.

Furthermore, server 103 can be configured to communicate with other features in an environment within which chassis 109 and/or unmanned vehicle 101 is to move to control such features, for example in response to chassis 109 and/or unmanned vehicle 101 being located at a given coordinate.

Attention is now directed to FIG. 3 which depicts a flowchart of a method 300 for implementing variable references frames in unmanned vehicles, according to non-limiting implementations. In order to assist in the explanation of method 300, it will be assumed that method 300 is performed using system 200, and specifically by processor 120 of unmanned vehicle 101, for example when processor 120 processes application 147. Indeed, method 300 is one way in which unmanned vehicle 101 can be configured. Furthermore, the following discussion of method 300 will lead to a further understanding of unmanned vehicle 101, and system 200 and its various components. However, it is to be understood that unmanned vehicle 101, system 200 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of unmanned vehicle 101 and/or system 200 as well.

At block 301, processor 120 receives, using communication interface 124, a command to move to a given coordinate in global reference frame 145.

At block 303, processor 120 controls propulsion system 115 to move chassis 109 to the given coordinate in global reference frame 145 based on the command.

At block 305, processor 120 monitors a position of chassis 109, for example using GPS device 130, and when chassis 109 is at the given coordinate (i.e. a "YES" decision at block 305, a "NO" decision at block 305 leading to further monitoring of the position of chassis 109), at block 307, processor 120 determines, using one or more sensors 119, whether a given feature is detected.

When the given feature is detected (i.e. a "YES" decision at block 307, a "NO" decision at block 307 leading to further monitoring of one or more sensors to determine whether the given feature is detected), at block 309, processor 120 automatically ceases controlling propulsion system 115 according to global reference frame 145. Furthermore, at block 311, processor 120 automatically controls propulsion system 115 to move chassis 109 according to local reference frame 146 defined with reference to a point associated with the given feature. Such control of propulsion system 115 can include, but is not limited to, controlling propulsion system 115 to move chassis 109 according to task data and according to the local reference frame, for example, the task data received in association with receiving the command at block 301. The task data can comprise one or more further commands for controlling chassis 109 to move with respect to local reference frame 146, for example to implement a task such as loading one or more items onto surface 153 from a conveyor and the like, and/or off-loading one or more items from surface 153 to a conveyor and the like.

Method 300 will now be described with respect to FIGS. 4 to 11. In particular, FIG. 5 is similar to FIG. 2, with like elements having like numbers. Furthermore, each of FIGS. 4, 6, 7, 9a, 9b, and 9c are similar to each other, with like elements having like numbers.

Figure 4:
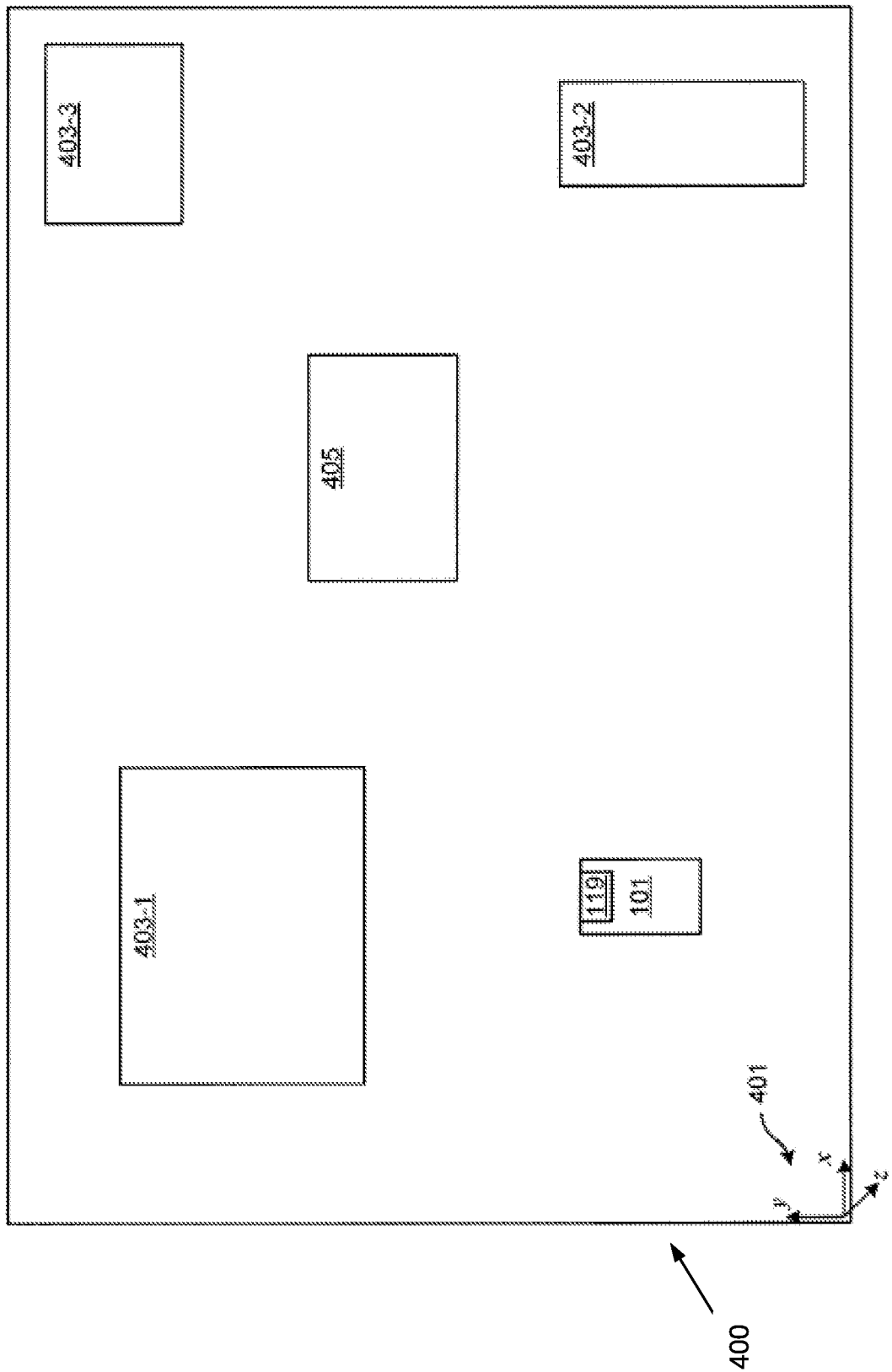
FIG. 4 depicts an environment within which the unmanned vehicle of FIG. 1 can move, according to non-limiting implementations.
Figure 5:
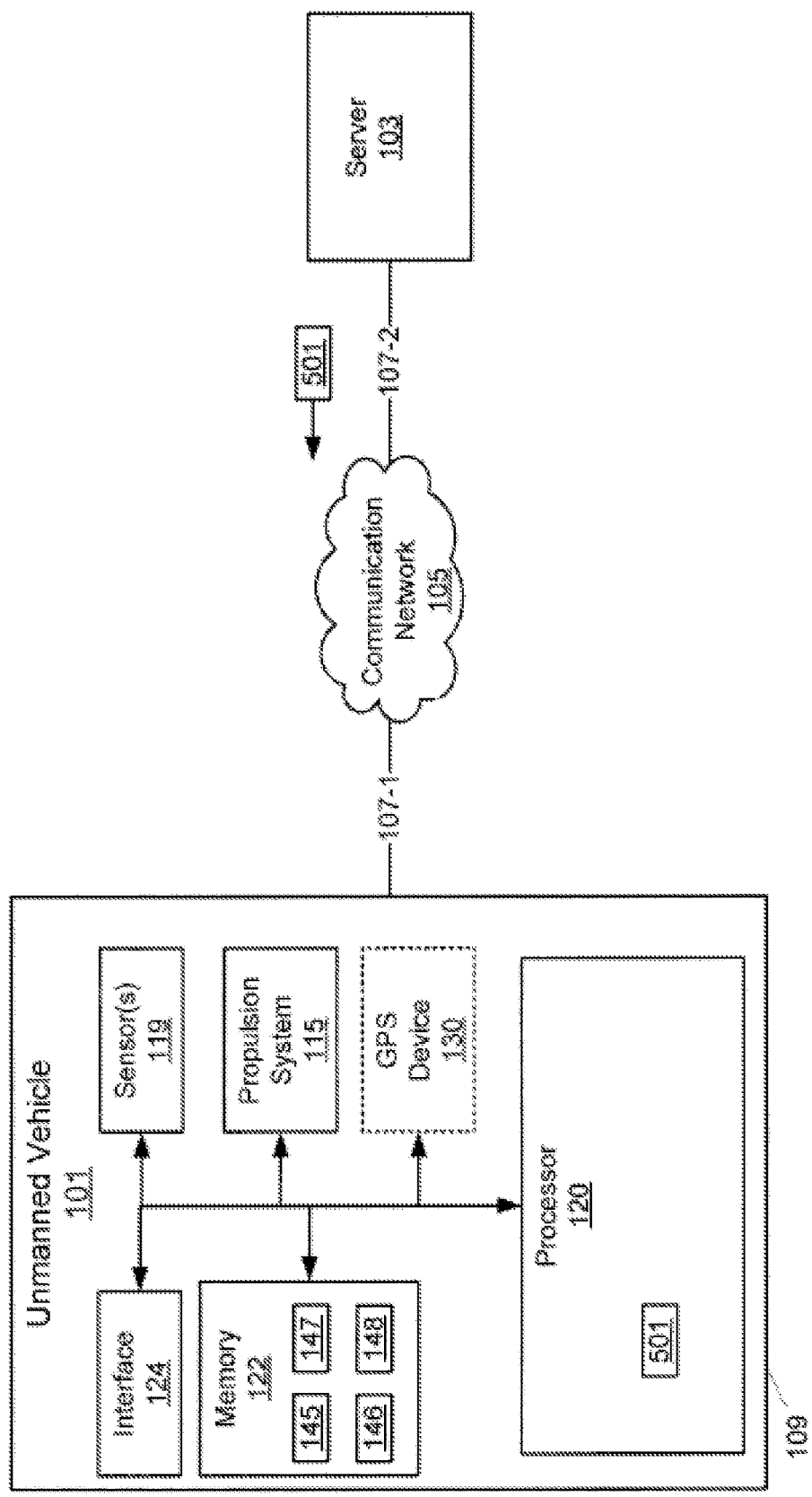
FIG. 5 depicts the unmanned vehicle receiving a command in the system of FIG. 2, according to non-limiting implementations.
Figure 6:
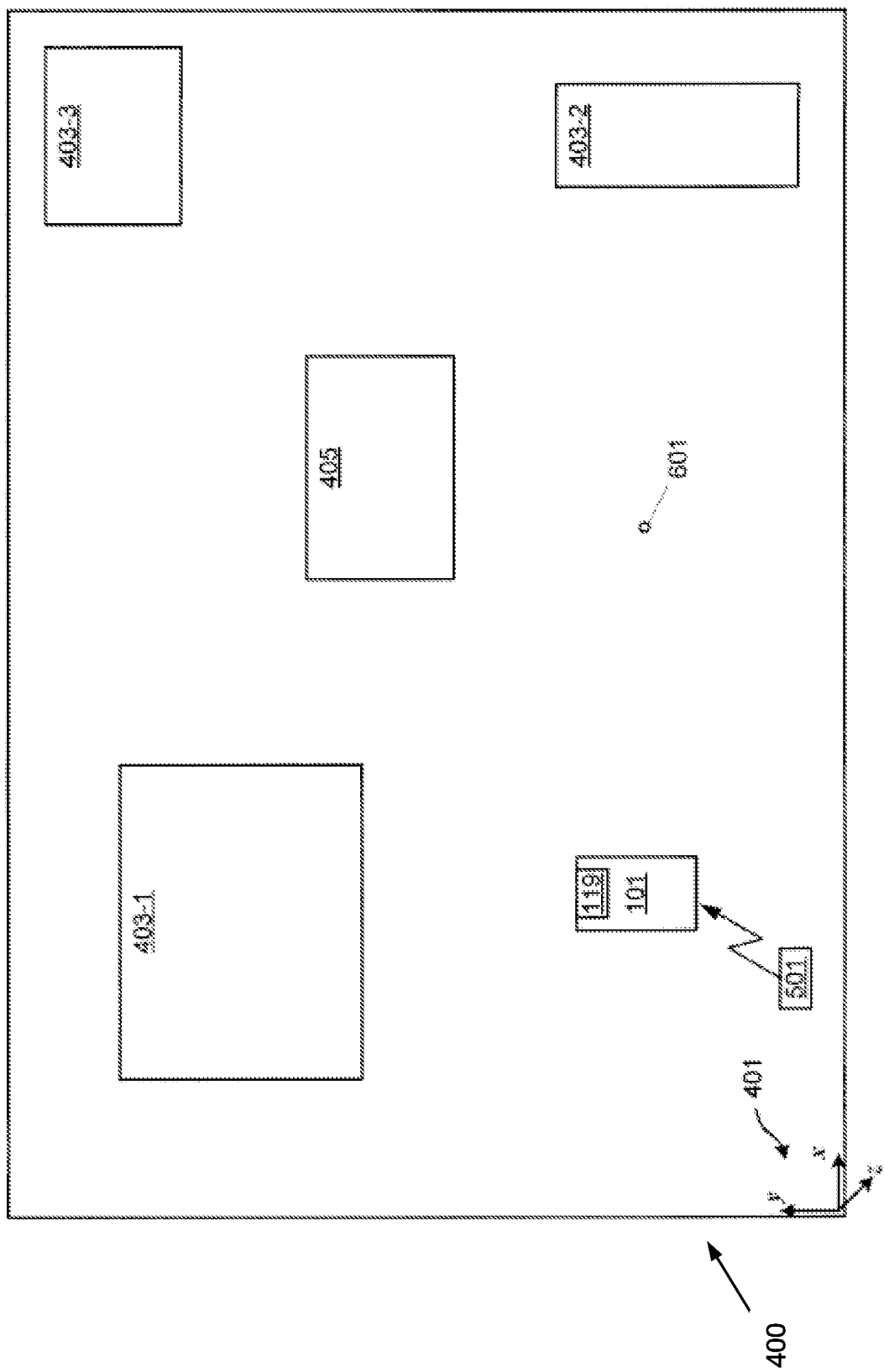
FIG. 6 depicts the unmanned vehicle receiving a command in the environment of FIG. 4, according to non-limiting implementations.
Figure 7:
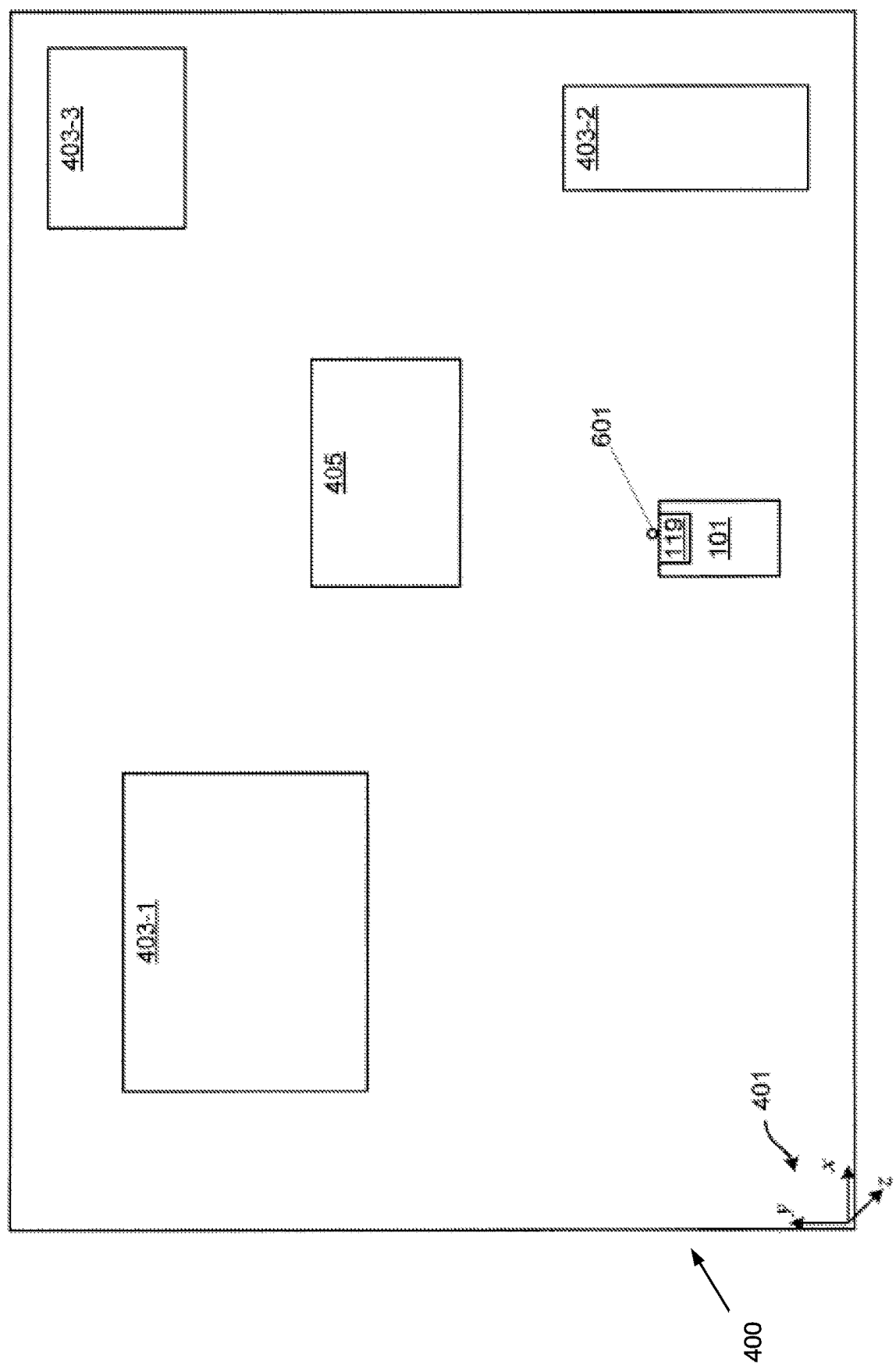
FIG. 7 depicts the unmanned vehicle moving to a given coordinate in a global reference frame, according to non-limiting implementations.

Attention is next directed to FIG. 4 which depicts an environment 400 in which unmanned vehicle 101 is moving according to global reference frame 145. Unmanned vehicle 101 is depicted schematically in FIG. 4 as a rectangle, though it is appreciated that unmanned vehicle 101 is moving within environment 400 using propulsion system 115 and/or wheels, not depicted in FIG. 4 but nonetheless assumed to be present).

Global reference frame 145 is generally represented in FIG. 4 by a coordinate system 401 comprising an x-axis (e.g. a length of environment 400), a y-axis (e.g. a width of environment 400) and an optional z-axis (e.g. a height within environment 400).

In a non-limiting example environment 400 can comprise a warehouse having walls (i.e. as indicated by a rectangle in FIG. 4 defining external limits of the warehouse) and features 403-1, 403-2, 403-3, 405 therein, which can include, but are not limited to shelving, workstations, storage areas, conveyors and the like. Features 403-1, 403-2, 403-3 will be interchangeably referred to hereafter, collectively, as features 403 and generically as a feature 403. Furthermore, while four features 403, 405 are depicted, environment 400 can comprise any number of features. Furthermore, server 103 and at least feature 405 can be configured to communicate with each other, similar to communication described above with respect to unmanned vehicle 101 and server 103; hence, while not depicted, feature 405 can comprise at least a communication interface, similar to interface 124, configured to communicate with server 103 via network 105 and/or another communication network. Feature 405 can further comprise a processor configured to implement commands received from server 103, for example to control a conveyor device to off load items onto unmanned vehicle 101 and/or to load items from unmanned vehicle 101 onto the conveyor device.

Furthermore, global reference frame 145, as stored in memory 122 can comprise and/or be associated with a digital map of environment 400 within which chassis 109 and/or unmanned vehicle 101 is to move. For example, global reference frame 145 can be at least partially defined by coordinate system 401 that includes an origin (i.e. a "0,0" and/or "0,0,0" position) located at a given position corresponding to a location in global and/or GPS coordinates, as well as coordinates corresponding to features 403, 405. As depicted, an origin of global reference frame 145 is located in a corner of environment 400 (i.e. where an origin of coordinate system 401 is located) and positions of features 403, 405, including, but not limited to sides of features, can be stored in global reference frame 145 as one or more coordinates defined with respect to the origin.

When unmanned vehicle 101 comprises GPS device 130, processor 120 can be further configured to convert a GPS location of chassis 109 and/or unmanned vehicle 101 into a coordinate of global reference frame 145. In other words, coordinates in global reference frame 145 can generally correspond to GPS locations. However, processor 120 can alternatively determine coordinates of chassis 109 and/or unmanned vehicle 101 in global reference frame 145 without reference to GPS locations but rather using a motion capture system and/or like configured to determine a position of chassis 109 and/or unmanned vehicle 101 with respect to the origin, including, but not limited to, using sensors 119 in conjunction with any suitable algorithms (i.e. without explicitly using and/or needing GPS device 130).

In any event, by determining a coordinate of chassis 109 and/or unmanned vehicle 101 with respect to the origin, and by processing global reference frame 145, processor 120 can cause chassis 109 and/or unmanned vehicle 101 to move within environment 400 from coordinate to coordinate while simultaneously avoiding features 403, 405 therein.

While not depicted in FIG. 4, it is assumed that unmanned vehicle 101 is in communication with server 103 via network 105 and wireless link 107-1, and that server 103 can transmit commands to unmanned vehicle 101 thereby. For example, with reference to FIGS. 5 and 6, server 103 can transmit a command 501 to unmanned vehicle 101 via network 105 and links 107 (e.g. processor 120 receives command 501 at block 301).

In particular, it is assumed that command 501 comprises a command to move chassis 109 and/or unmanned vehicle 101 to a given coordinate 601 in global reference frame 145. Given coordinate 601 can be defined with respect to the origin of global reference frame 145. Hence, when unmanned vehicle 101 receives command 501, processor 120 processes command 501 and controls propulsion system 115 to move chassis 109 and/or unmanned vehicle 101 to given coordinate 601 by causing the wheels to move and/or turn and/or steer in a manner that moves chassis 109 and/or unmanned vehicle 101 to given coordinate 601. Processor 120 can further convert command 501 to a format that is suitable for implementation by components of unmanned vehicle 101. A position of a chassis 109 and/or unmanned vehicle 101 can be monitored using GPS device 130, and the like (i.e. block 305).

In addition to a position of chassis 109 and/or unmanned vehicle 101, a relative orientation of chassis 109 and/or unmanned vehicle 101 in global reference frame 145 can also be determined and/or monitored using one or more sensors 119, for example using accelerometers, magnetometers and the like; similarly, command 501 can comprise a command to move chassis 109 and/or unmanned vehicle 101 to given coordinate 601 and to a particular relative orientation in global reference frame 145. For example, with reference to FIG. 7, unmanned vehicle 101 has moved to given coordinate 601 in an orientation where sensor 119 (i.e. a front of chassis 109 and/or unmanned vehicle 101) is facing a given side of feature 405.

In other words, when command 501 is received, processor 120 can determine a current coordinate of chassis 109 and/or unmanned vehicle 101 in global reference frame 145, and move chassis 109 and/or unmanned vehicle 101 to given coordinate 601 in global reference frame 145, at a given and/or relative orientation, as indicated by given coordinate 601.

In any event, processor 120 can determine when chassis 109 and/or unmanned vehicle 101 is at given coordinate 601 using geofences and the like, and/or when chassis 109 and/or unmanned vehicle 101 is within a given distance from coordinate 601. In other words, chassis 109 and/or unmanned vehicle 101 need not be exactly located at given coordinate 601 for processor 120 to determine that chassis 109 and/or unmanned vehicle 101 has arrived at given coordinate 601.

Figure 8:
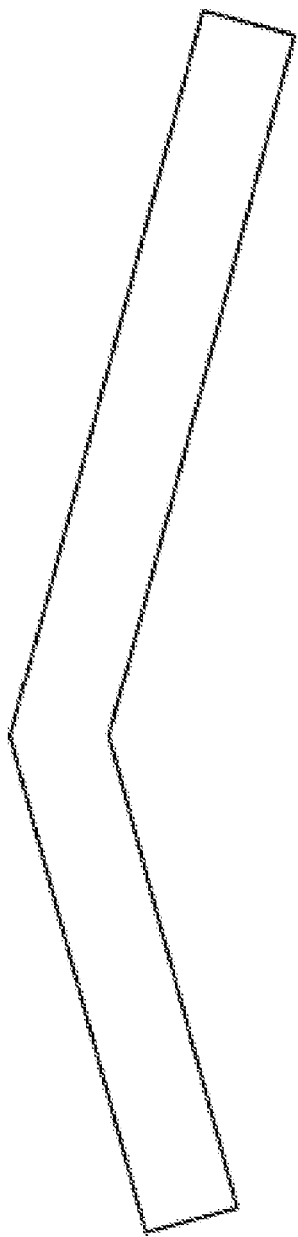
FIG. 8 depicts a visual representation of sensor data, according to non-limiting implementations.

With reference to FIG. 8, which depicts a visual representation of sensor data 801, and in particular sensor data corresponding to a portion of feature 405 sensed by one or more sensors 119, processor 120 compares sensor data 801 to data 148 stored in memory 122. In depicted implementations, data 148 is representative of a portion of feature 405 that can be sensed by one or more sensors 119 when chassis 109 and/or unmanned vehicle 101 is at given coordinate 601 and in the depicted orientation. Data 148 can hence be configured at memory 122 in a provisioning process, for example by controlling chassis 109 and/or unmanned vehicle 101 through a provisioning path in environment 400, with respect to global reference frame 145, and collecting sensor data from one or more sensors 119 at given coordinate 601 prior to receiving command 501; sensor data collected by one or more sensors 119 at given coordinate 601 can then be stored at memory 122 as data 148. Furthermore, while FIG. 8 depicts a visual representation of sensor data 801, sensor data 801, as well as data 148, can be in any format produced by a given sensor 119.

After command 501 is received, and when chassis 109 and/or unmanned vehicle 101 is at given coordinate 601, processor 120 compares sensor data 801 to data 148 and, when a match occurs (including, but not limited to a match of a threshold amount of sensor data 801 to data 148), a "YES" decision can occur at block 307.

In particular, feature 405, for example a conveyor and the like, need not be at the same coordinates in global reference frame 145 as when data 148 was provisioned. For example, feature 405 can have moved relative to a starting position (and/or a position stored in a digital map of environment 400), and processor 120 can nonetheless compare sensor data 801 to data 148 and determine that a match has occurred. In other words, data 148 does not assume that feature 405 is in a fixed position within global reference frame 145; rather, processor 120 determines that a feature corresponding to data 148 is within a field of view, and the like, of one or more sensors 119 when chassis 109 and/or unmanned vehicle 101 is at given coordinate 601.

With reference to FIG. 9, when chassis 109 and/or unmanned vehicle 101 is at given coordinate 601, and processor 120 both automatically ceases controlling propulsion system 115 according to global reference frame 145 (i.e. block 309) and automatically controls propulsion system 115 according to local reference frame 146 defined with reference to a point 902 associated with given feature 405 (i.e. block 311, which can be implemented in parallel with block 309).

For example, a given corner of feature 405 can correspond to point 902, which in turn can correspond to an origin of a coordinate system 903 comprising an x-axis (e.g. a length of feature 405), a y-axis (e.g. a width of feature 405) and an optional z-axis (e.g. a height of feature 405 and/or a height defined with respect to point 902). Hence, at block 309, processor 120 begins to navigate with respect to local reference frame 146 (i.e. coordinate system 903 and/or an origin thereof). Hence, local reference frame 146 can comprise one or more coordinates defined with respect to an origin of coordinate system 903; in some implementations, local reference frame 146 comprises only an origin of coordinate system and indications of directions of the x-axis and the y-axis (and optionally the z-axis) of coordinate system 903. In other words, positions of edges and/or sides of feature 405 need not be specified; rather task data, which can be received with command 501, and which defines movement of chassis 109 and/or unmanned vehicle 101, can be specified with respect to local reference frame 146 and without reference to locations of components and the like of feature 405.

Hence, when feature 405 has moved since data 148 was provisioned, for example due to vibration and the like, a position of feature 405 within environment 400, and/or a digital map of environment 400, becomes irrelevant with respect to unmanned vehicle 101, and unmanned vehicle 101 is navigated and/or moved with respect to local reference frame 146 rather than global reference frame 145. Hence, an exact position of feature 405 need not be updated and/or maintained in global reference frame 145, and/or a digital map of environment 400. Indeed, updating and/or maintaining an exact position of feature 405 within global reference frame 145 can be difficult when movement of feature 405 due, for example, to vibration results in feature 405 moving a few centimetres in random directions and at random times. However, as a weight of unmanned vehicle 101 can be on the order of hundreds of kilograms and even thousands of kilograms, and as a position of chassis 109 and/or unmanned vehicle 101 often should be controlled to within a few centimetres and/or fractions of an inch in order to implement a given task, relying on global reference frame 145 to control precise movement of chassis 109 and/or unmanned vehicle 101 can lead to, at best, a failure to implement a task and, at worst, damage to feature 405 and/or unmanned vehicle 101 as crashes occur.

When feature 405 is not detected at block 309, for example, within a given time period, which can occur, for example, when feature 405 has moved and/or changed orientation so that a match between sensor data and data 148 cannot occur, processor 120 and/or unmanned vehicle 101 can transmit an error to server 103 to await further commands as to how to move, and/or move to another given coordinate within global reference frame 145. In other words, in these implementations a consistent "NO" decision at block 309 can cause processor 120 and/or unmanned vehicle 101 to enter a remedial mode, and the like.

Figure 9A:
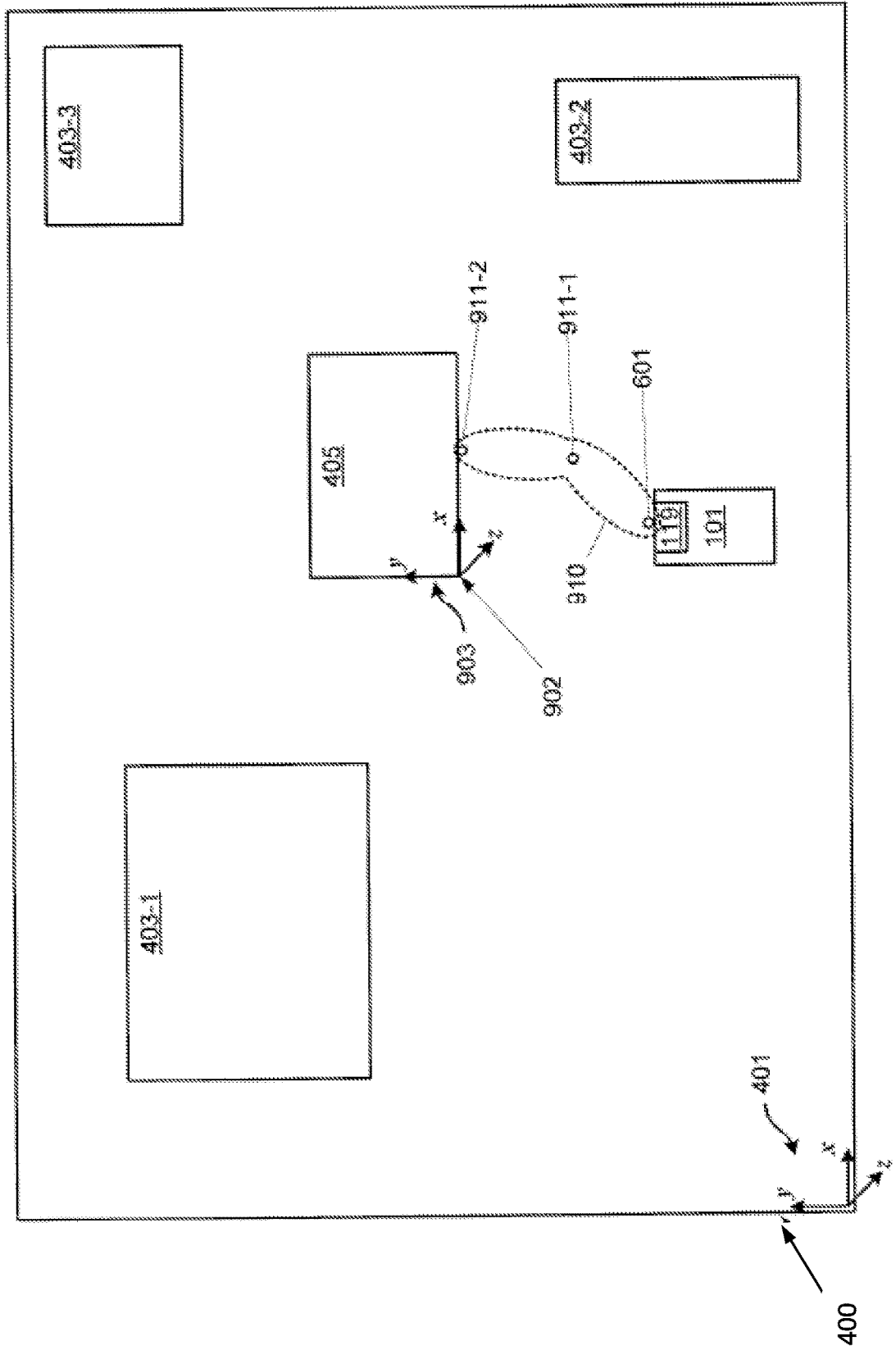
FIG. 9a depicts the unmanned vehicle switching to a local reference frame in the environment of FIG. 4, according to non-limiting implementations.
Figure 9C:
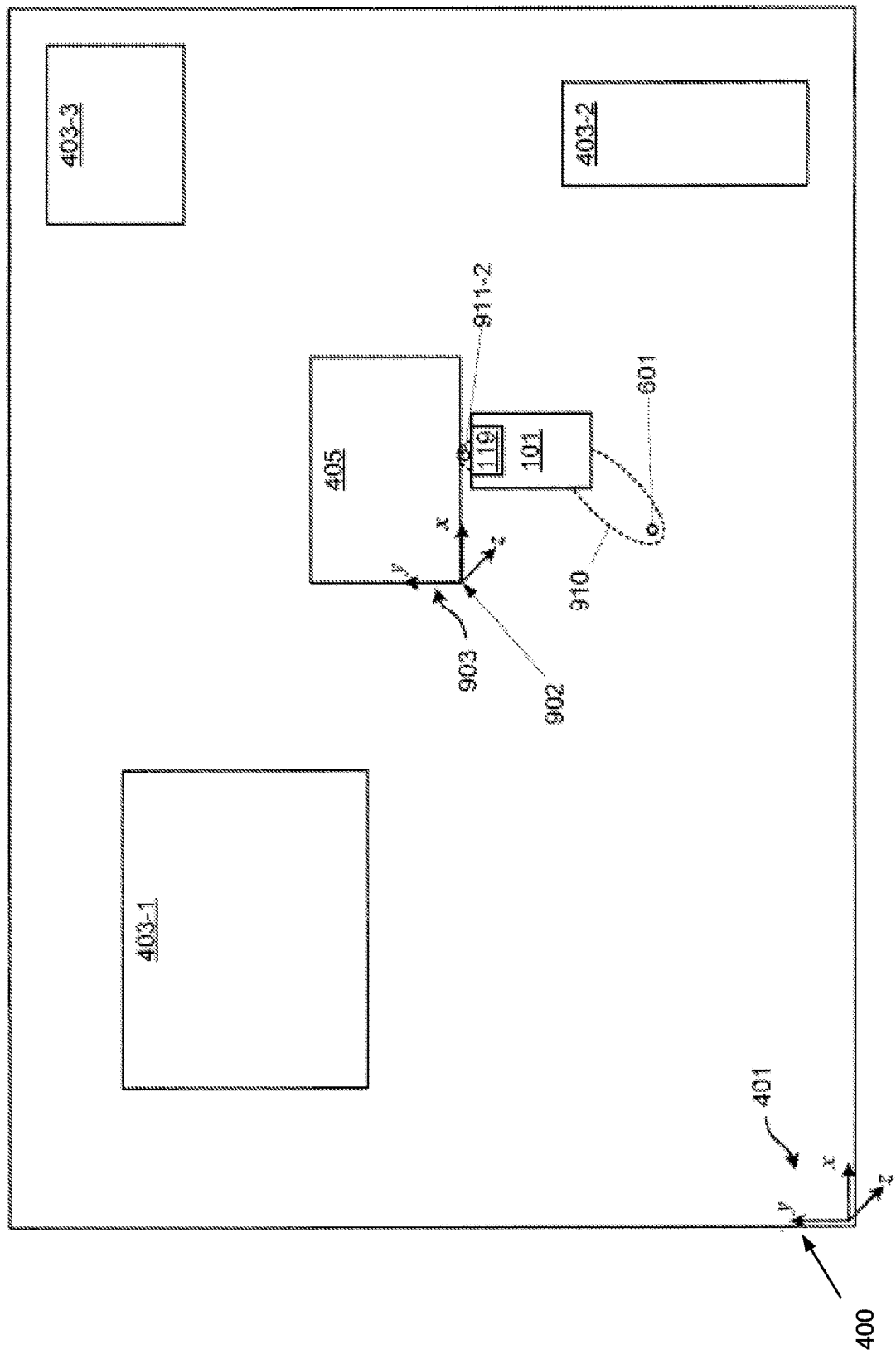
FIG. 9c depicts the unmanned vehicle at a final position in the path in the local reference frame in the environment of FIG. 4, according to non-limiting implementations.

With further reference to FIG. 9a, in implementing block 311, processor 120 can implement task data received with and/or within command 501. For example, command 501 can comprise task data which in turn comprises further commands for controlling chassis 109 and/or unmanned vehicle 101 to move with respect to local reference frame 146. For example as also depicted in FIG. 9, task data can comprise commands to move chassis 109 and/or unmanned vehicle 101 along a path 910 defined, for example, at least by coordinates 911-1, 911-2 (interchangeably referred to, collectively, as coordinates 911 and, generically, as coordinates 911), which are defined with respect to local reference frame 146 (i.e. within coordinate system 903), though any number of coordinates are within the scope of present implementations. In other words path 910 is not defined according to global reference frame 145 (i.e. using coordinate system 401) but according to local reference frame 146 (i.e. using coordinate system 903).

For example, processor 120 can control propulsion system 115 to move chassis 109 and/or unmanned vehicle 101 to coordinate 911-2 using one or more sensors 119, a motion capture system, and the like, navigating with reference to an origin of coordinate system 903, and moving from given coordinate 601 (which can be redefined with respect local reference frame 146 and/or coordinate system 903) to coordinate 911-1, as depicted in FIG. 9b, and finally to coordinate 911-2, as depicted in FIG. 9b.

The task data can also define a speed and/or acceleration of chassis 109 and/or unmanned vehicle 101 and/or propulsion system 115 at each coordinate 911, and processor 120 can control the speed and/or acceleration of chassis 109 and/or unmanned vehicle 101 and/or propulsion system 115 at each coordinate 911, accordingly. Furthermore, such navigation can occur according to a given orientation of chassis 109 and/or unmanned vehicle with reference to local reference frame 146, which can also be specified in the task data at each coordinate 911.

In any event, once chassis 109 and/or unmanned vehicle 101 is located at coordinate 911-2, as depicted in FIG. 9b, which can be a final coordinate in path 910, and at a given orientation at coordinate 911-2, processor 120 can transmit a message to server 103 indicative of one or more of chassis 109 and/or unmanned vehicle 101 being located at coordinate 911-2 and/or completing at least a portion of the task data. Server 103 can then control feature 405 to implement a respective task, for example to upload items from or offload items to unmanned vehicle 101.

Once a task associated with feature 405 is completed (as determined by server 103 via communication with feature 405), server 103 can transmit a further command to unmanned vehicle 101 to either process a remaining portion of the task data and/or the further command can comprise further task data; either way, upon receiving the further command, processor 120 can: automatically cease controlling propulsion system 115 according to local reference frame 146; and, automatically control propulsion system 115 to move chassis 109 and/or unmanned vehicle 101 according the global reference frame 145. Alternatively, processor 120 can switch back to controlling propulsion system 115 according to global reference frame 145 when processing of the task data are complete.

In other words, processor 120 can be configured to process task data when controlling propulsion system 115 to move chassis 109 and/or unmanned vehicle 101 according local reference frame 146; and, when processing of the task data are completed: automatically cease controlling propulsion system 115 according to local reference frame 146; and, automatically control propulsion system 115 to move chassis 109 and/or unmanned vehicle 101 according to global reference frame 145.

In some implementations, server 103 can transmit a further command to unmanned vehicle 101 to move to a coordinate in global reference frame 145, for example to offload items received from feature 405 to feature 403-1, which can comprise an offloading area for such items and/or a storage area for such items, and the like.

Method 300 can be implemented again when unmanned vehicle 101 arrives at another given coordinate in global reference frame 145 associated, for example, with feature 403-1, presuming that another local reference frame (not depicted) is defined with respect to a point on feature 403-1. In other words, system 200 can comprise any number of local reference frames, for example at least one local reference frame associated with each feature 403, 405, and/or at least one local reference frame associated with a portion of features 403, 405.

Furthermore, a feature 403, 405 can be associated with more than one local reference frame. For example, as described above, local reference frame 146, and data 148, are defined in a manner that assumes that a front of unmanned vehicle 101 (and/or a side of unmanned vehicle 101 where one or more sensors 119 are located) will implement task data that assumes that a given side of feature 405 is located at given coordinate of local reference frame 146. However, system 200 can include a second local reference frame, and memory 122 can store further data similar to data 148, that is defined with respect to another point of feature 405, for example located on an opposite side of feature 405 from point 902 and/or given coordinate 601. Hence, unmanned vehicle 101 can then sense and/or detect the another point when unmanned vehicle 101 is located on a side of feature 405 opposite point 902 and/or given coordinate 601, and thereafter navigate according to the second local reference frame, for example to implement task data associated with the opposite side. In this manner, unmanned vehicle 101 can, for example, load items to, and/or offload items from, feature 405 from opposite sides, independent of global reference frame 145.

In some implementations, processor 120 is further configured to change from a first set of control parameters to second set of control parameters when automatically controlling propulsion system 115 to move chassis 109 and/or unmanned vehicle 101 according local reference frame 146. For example, while not depicted, memory 122 can store a first set control parameters for controlling unmanned vehicle 101 according to global reference frame 145, including, but not limited to, definitions of coordinate system 401 and/or parameters that relate a coordinate of global reference frame 145 to GPS coordinates. However, memory 122 can further store a second set of control parameters for controlling unmanned vehicle 101 according to local reference frame 146, including, but not limited to definitions of coordinate system 903. Hence, when moving chassis 109 and/or unmanned vehicle 101 according global reference frame 145 and local reference frame 146, processor 120 can switch between the sets of control parameters.

Put another way, processor 120 can be configured to automatically switch between using global reference frame 145 and using local reference frame 146 based on one or more of: whether chassis 109 and/or unmanned vehicle 101 is at one or more given locations; one or more given features detected using one or more sensors 119; and whether processing of task data has been completed.

Persons skilled in the art will appreciate that there are yet more alternative implementations and modifications possible. For example, in some implementations, processor 120 can be further configured to switch to a reactive mode when automatically controlling propulsion system 115 to move chassis 109 and/or unmanned vehicle 101 according local reference frame 146.

Figure 10:
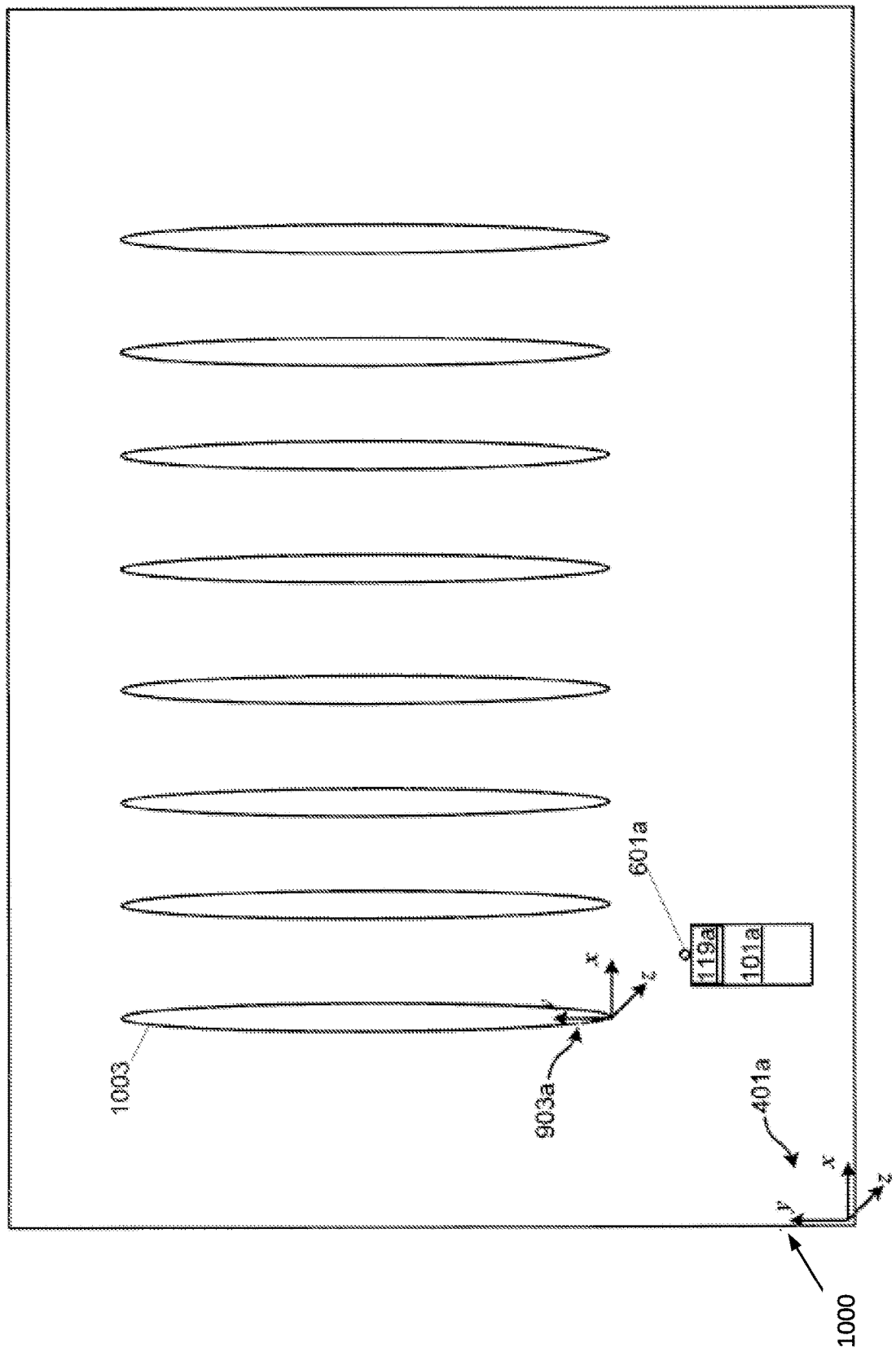
FIG. 10 depicts an alternative unmanned vehicle in an alternative example environment, according to non-limiting implementations.

For example, attention is next directed to FIG. 10 which depicts an alternative implementation of an unmanned vehicle 101a, that is substantially similar to unmanned vehicle 101, but configured for farming tasks in an environment 1000 comprising rows 1003 of environment 1000, including, but not limited to rows of grain, and the like. In other words, in these implementations, environment 1000 comprises a field, and features of environment 1000 comprise rows 1003. Unmanned vehicle 101a hence comprises similar features as depicted in FIG. 2 for unmanned vehicle 101, though only a sensor 119a, similar to one or more sensors 119a, mounted at a front of unmanned vehicle 101a is depicted in FIG. 10. However, unmanned vehicle 101a further comprises tools and/or systems associated with farming tasks; for example, unmanned vehicle 101a can comprise a tractor, a plow, a combine and the like.

Furthermore, a global reference system in environment 1000 corresponds to a coordinate system 401a with an origin in a corner of environment 1000, including, but not limited to, a corner of a field, with coordinate system 401a being otherwise similar to coordinate system 401. A local reference system in environment 1000 corresponds to a coordinate system 903a with an origin at an end of a row 1003.

In any event, after receiving a command, similar to command 501, from a server, similar to server 103, and/or other control device (e.g. a computing device in communication with unmanned vehicle 101a that is controlled by a farmer of environment 1000), unmanned vehicle 101a moves to given coordinate 601a defined with respect to the global reference system and thereafter switches to movement defined with respect to the local reference system, with unmanned vehicle 101a storing data corresponding to the end of a row 1003 so that sensor data from sensor 119a can be used to determine when to switch to navigation using the local reference frame.

Figure 11:
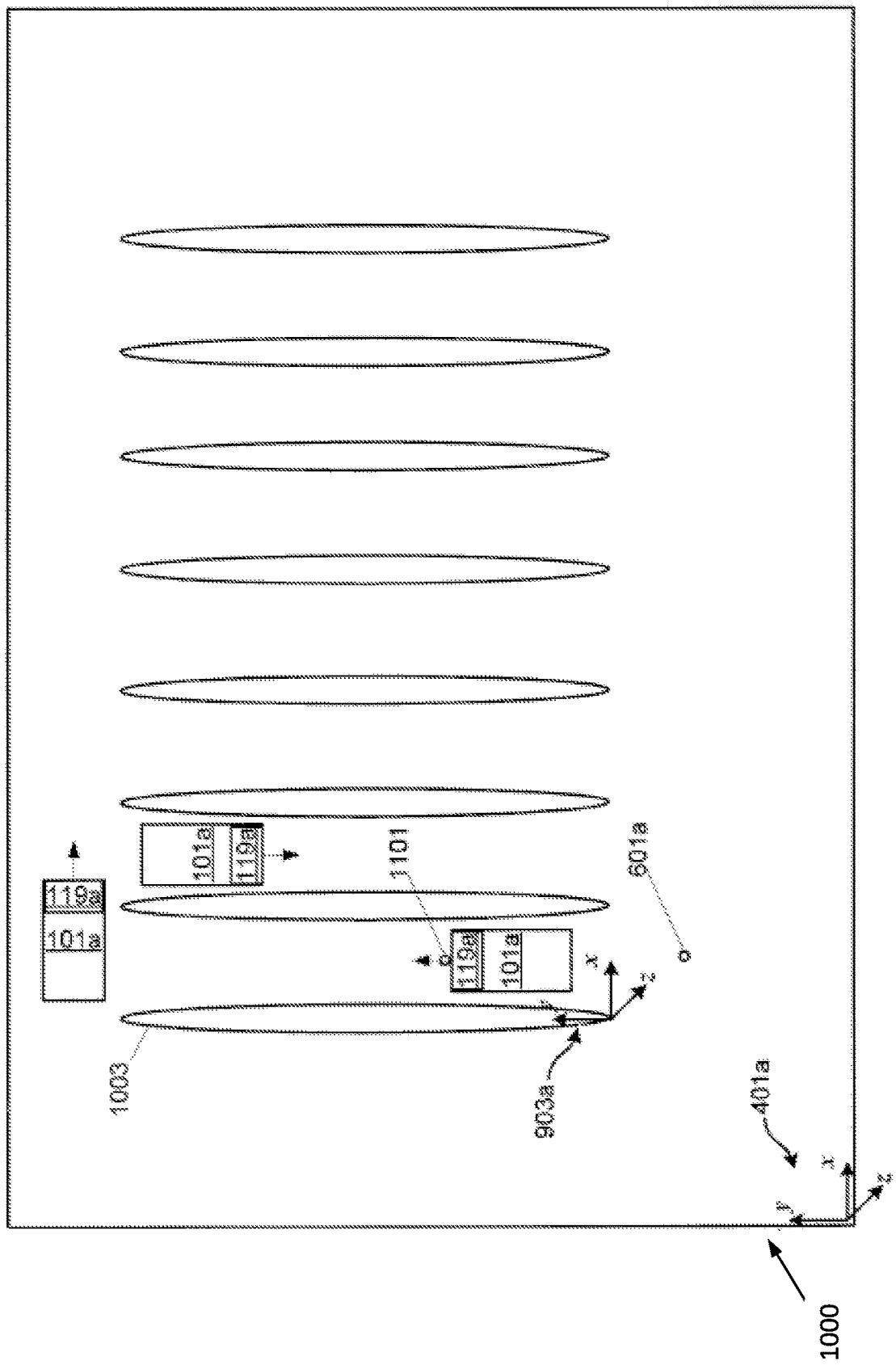
FIG. 11 depicts the alternative unmanned vehicle of FIG. 11 operating in a reactive mode, according to non-limiting implementations.

In any event, thereafter, the local reference frame can be used to move between rows 1003 to implement farming tasks (e.g. plowing, collecting grain, and the like), however unmanned vehicle 101a can operate in a reactive mode such that, for example, sides of rows 1003 can be recognised using sensor data to maintain a position there between and/or navigate to a next row, as depicted in FIG. 11, when sensor data are used to determine that an end of a given row has been reached. In other words, in the reactive mode, unmanned vehicle 101a can navigate according to features associated with the rows, reactively maintaining a position between rows 1003 and/or reactively making a series of right turns (as depicted in FIG. 11) to leave one row 1003 and navigate to a next row 1003 without reference to a local reference frame or a global reference frame.

However, method 300 can be used to initially position unmanned vehicle 101a into an initial position 1101, defined with reference to the local reference frame, for example between a first row 1003 and a second row 1003, prior to switching to a reactive mode. In some of these implementations, task data and/or command data can include data indicative of whether unmanned vehicle 101a is to turn left or right when an end of a first row is reached, as well as data indicative of a task to complete when last row is sensed. For example, data indicative of a coordinate within the global reference frame where unmanned vehicle 101a is to move to when unmanned vehicle 101a reaches an end of a last row, can be provided, for example barn and/or a grain unloading location.

In any event provided herein is a system, method and apparatus for implementation of variable references frames in unmanned vehicles in which unmanned vehicles can switch from a global reference frame to a local reference that is defined with respect to a feature within an environment in which the unmanned vehicles are operating, so that the unmanned vehicles can carry out tasks with respect to the local feature without damage, even when the local feature has moved within the global reference frame.

Those skilled in the art will appreciate that in some implementations, the functionality of unmanned vehicles 101, 101a and server 103 can be implemented using pre-programmed hardware or firmware elements (e.g., application specific integrated circuits (ASICs), electrically erasable programmable read-only memories (EEPROMs), etc.), or other related components. In other implementations, the functionality of unmanned vehicle 101, 101a and server 103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is to be limited by the claims appended here.

What is claimed is:

1. An unmanned land vehicle for autonomously navigating an indoor environment, the unmanned vehicle comprising:
   a chassis;
   a propulsion system configured to move the chassis;
   one or more sensors configured to sense features around the chassis;
   a memory storing feature reference data, wherein the feature reference data is expressed relative to a global reference frame, the global reference frame having a global origin defined with respect to a point in the indoor environment;
   a communication interface; and
   a processor coupled to the propulsion system, the one or more sensors, the memory and the communication interface, the processor configured to:
      receive, using the communication interface, a command comprising task data and a location associated with a given feature, wherein the location corresponds to an initial location for the given feature, and the location is defined with respect to the global reference frame, wherein the given feature can shift during use within the indoor environment;
      control the propulsion system to move the chassis to the location using the global reference frame;
      while the chassis is moving to the location, monitor for the given feature using sensor data generated by the one or more sensors;
      in response to determining a match between at least a portion of the given feature based on the sensor data and the feature reference data:
         retrieve from the memory one or more local reference frames defined with reference to the given feature;
         select a local reference frame from the one or more local reference frames based on an orientation of the unmanned land vehicle relative to the given feature; and
         automatically control the propulsion system according to the local reference frame to execute a task defined by the task data, wherein the task data comprises commands to move the chassis according to the local reference frame.

2. The unmanned land vehicle of claim 1, the unmanned land vehicle further comprising a load-bearing surface, and the task data are associated with a task of loading an item onto the load-bearing surface.

3. The unmanned land vehicle of claim 1, wherein the feature is a conveyor, and the task data are associated with a task of interacting with the conveyor.

4. The unmanned land vehicle of claim 1, wherein the task data are associated with a pre-defined path, and the processor is configured to control the propulsion system to move the chassis according to the pre-defined path.

5. The unmanned land vehicle of claim 1, wherein the task data are associated with a pre-defined speed, and the processor is configured to control the propulsion system to move the chassis according to the pre-defined speed.

6. The unmanned land vehicle of claim 1, wherein the task data are associated with a pre-defined acceleration, the processor is configured to control the propulsion system to move the chassis according to the pre-defined acceleration.

7. The unmanned land vehicle of claim 1, wherein the processor is configured to control the propulsion system to execute the task relative to the location of the given feature.

8. A method of operating an unmanned land vehicle for autonomously navigating an indoor environment, the method comprising:
   receiving, at a processor of the unmanned land vehicle, using a communication interface of the unmanned land vehicle, a command comprising task data and a location associated with a given feature, wherein the location corresponds to an initial location for the given feature, and the location is defined with respect to a global reference frame, and wherein the given feature can shift during use within the indoor environment, the global reference frame having a global origin defined with respect to a point in the indoor environment, the unmanned vehicle comprising:
   a chassis;
   a propulsion system configured to move the chassis;
   one or more sensors configured to sense features around the chassis;
   a memory storing feature reference data, wherein the feature reference data is expressed relative to the global reference frame;
   and the processor coupled to the propulsion system, the one or more sensors, the memory and the communication interface;
   controlling, using the processor, the propulsion system to move the chassis to the location based on the command using the global reference frame;
   while the chassis is moving to the location, operating the processor to monitor for the given feature using sensor data generated by the one or more sensors;
   in response to determining a match between at least a portion of the given feature based on the sensor data and the feature reference data:
      retrieving from the memory one or more local reference frames defined with reference to the given feature;
      selecting a local reference frame from the one or more local reference frames based on an orientation of the unmanned land vehicle relative to the given feature; and
      automatically controlling the propulsion system according to the local reference frame to
      execute a task based on the task data, wherein the task data comprises commands to move the chassis according to the local reference frame.

9. The method of claim 8, wherein executing the task comprises controlling the propulsion system based on the task data.

10. The method of claim 8, wherein the unmanned land vehicle further comprises a load-bearing surface, the task data are associated with a task of loading an item onto the load bearing surface, and executing the task comprises controlling the propulsion system based on the task data while the item is loaded onto the load-bearing surface.

11. The method of claim 8, wherein the feature is a conveyor, the task data are associated with a task of interacting with the conveyor, and executing the task comprises controlling the propulsion system to interact the chassis with the conveyor.

12. The method of claim 8, wherein the task data are associated with a pre-defined path, and executing the task comprises controlling the propulsion system to move the chassis along the pre-defined path.

13. The method of claim 8, wherein the task data are associated with a pre-defined speed, and executing the task comprises controlling the propulsion system to move the chassis according to the pre-defined speed.

14. The method of claim 8, wherein the task data are associated with a pre-defined acceleration, and executing the task comprises controlling the propulsion system to move the chassis according to the pre-defined acceleration.

15. The method of claim 8, wherein executing the task comprises controlling the propulsion system to move the chassis based on a position of the chassis relative to the location of the given feature.

* * * * *